United States Patent
Ferrucci et al.

(10) Patent No.: US 7,178,105 B1
(45) Date of Patent: Feb. 13, 2007

(54) METHOD AND SYSTEM FOR DOCUMENT COMPONENT IMPORTATION AND RECONCILIATION

(75) Inventors: David Angelo Ferrucci, Yorktown Heights, NY (US); Steinar Flatland, Clifton Park, NY (US); Adam Patrick Lally, Troy, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/497,800

(22) Filed: Feb. 4, 2000

(51) Int. Cl.
*G06F 17/24* (2006.01)
(52) U.S. Cl. .................................................... 715/530
(58) Field of Classification Search ................ 715/530
See application file for complete search history.

(56) References Cited

U.S. PATENT DOCUMENTS

| | | | |
|---|---|---|---|
| 5,842,018 A * | 11/1998 | Atkinson et al. | 715/501.1 |
| 6,209,004 B1 * | 3/2001 | Taylor | 715/500 |
| 6,263,379 B1 * | 7/2001 | Atkinson et al. | 719/332 |
| 6,279,015 B1 * | 8/2001 | Fong et al. | 715/513 |
| 6,405,225 B1 * | 6/2002 | Apfel et al. | 715/526 |
| 6,651,108 B2 * | 11/2003 | Popp et al. | 719/315 |
| 2001/0044813 A1 * | 11/2001 | Frank | 707/530 |

OTHER PUBLICATIONS

Boyce et al., Special Edition Using Microsoft Office 97, pp. 185-199 and 1017-1031, © 1997.*
Monson-Haefel, Richard, Enterprise JavaBeans, 3rd Edition, Chapter 9—"EJB 1.1 CMP" (O'Reilly & Associates, Inc. © 2001).*
Alur, Deepak et al., Core J2EE Patterns: Best Practice and Design Strategies, Second Edition, Chapter 7—"Business Tier Patterns" (Prentice Hall PTR © 2003).*
Shannon, Bill et al., Java 2 Platform, Enterprise Edition: Platform and Component Specifications, Chapter EJB.9—"Entity Bean Component Contract" (Addison Wesley © 2000).*

* cited by examiner

*Primary Examiner*—Doug Hutton
(74) *Attorney, Agent, or Firm*—Stephen C. Kaufman, Esq.; McGinn IP Law Group, PLLC

(57) ABSTRACT

A system and method for importing and reconciling component variables with container variables in a document, includes identifying variables in a component, for each of these variables determining if there is a variable in the container that refers to a same domain concept, and, if an identification occurs, associating the variable in the component with the variable in the container.

16 Claims, 3 Drawing Sheets

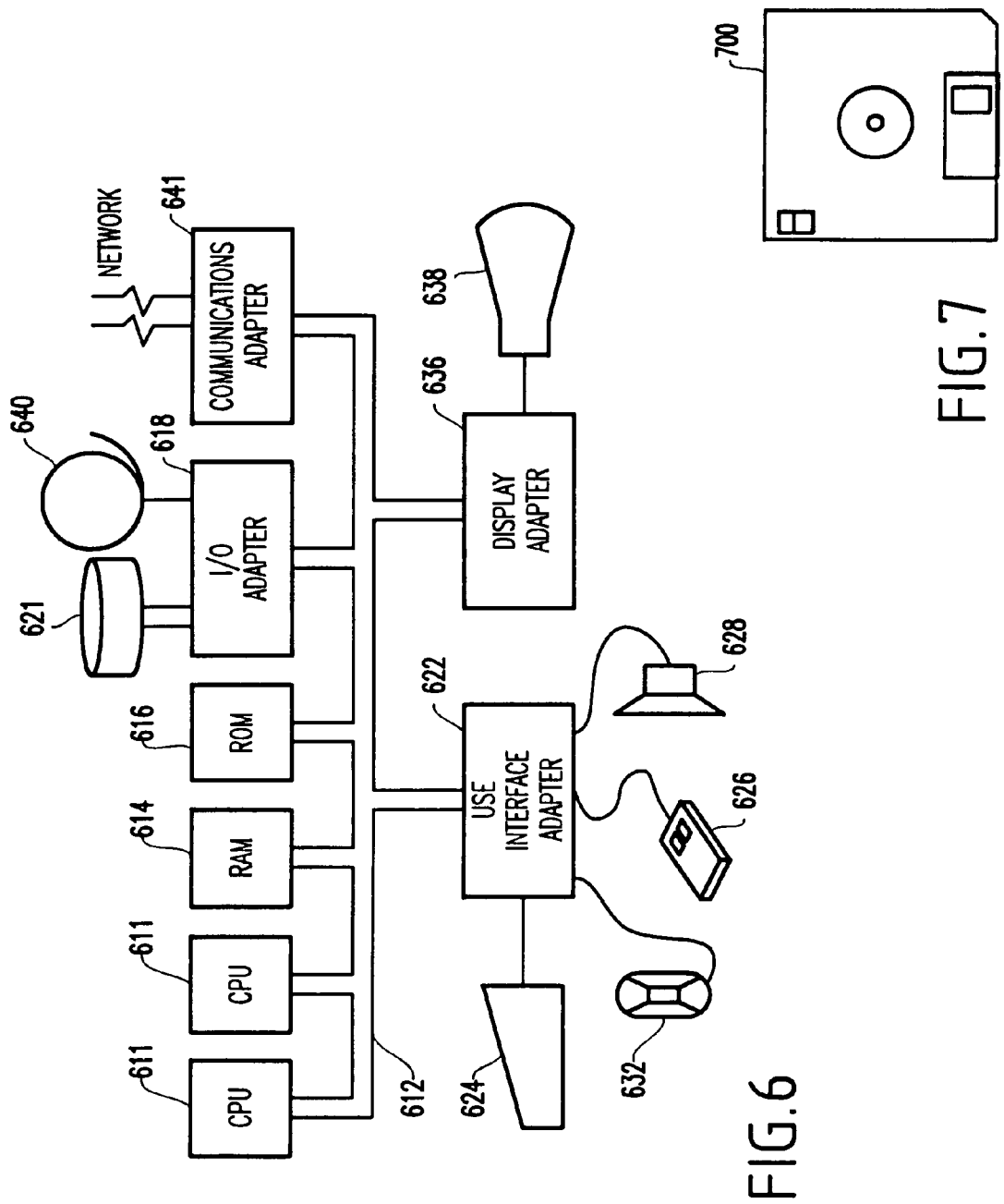

METHOD AND SYSTEM FOR DOCUMENT COMPONENT IMPORTATION AND RECONCILIATION

CROSS-REFERENCE TO RELATED APPLICATIONS

The present application is related to U.S. patent application No. 09/497,802 filed on Feb. 4, 2000, to Ferrucci et al., entitled "METHOD AND SYSTEM FOR INTERACTIVE DOCUMENT CONFIGURATION" having U.S. patent application No. 09/498,000 filed on Feb. 4, 2000, to Ferrucci et al., entitled "METHOD AND VISUAL APPARATUS FOR PRESENTING AND NAVIGATING A VARIABLE OBJECT MODEL", and to U.S. patent application No. 09/497,801 filed on Feb. 4, 2000, to Ferrucci et al., entitled "METHOD AND SYSTEM FOR LOOSE COUPLING OF DOCUMENT AND DOMAIN KNOWLEDGE IN INTERACTIVE DOCUMENT CONFIGURATION", each in their entirety incorporated herein by reference.

FIELD OF THE INVENTION

The present invention relates to a document component importation and reconciliation method and system, and more particularly to a system and method for reconciling component variables with container variables in a document.

DESCRIPTION OF THE RELATED ART

Document assembly systems represent documents as collections of paragraphs of text or "document components". Document assembly systems draw from a repository of these components. Given the answers to a series of questions, such systems select components from the repository and sequence them in order to compose an initial draft of a completed document.

Document components may contain "Variable Text" or simply variables. Variables are represented within a document component by a particular word or phrase, typically called a "field". The document assembly systems may assign different values to a variable depending on answers to the initial set of questions.

Document components refer to elements of some domain. For example, a loan agreement document will typically have components including the name and address of the lender and the amount of the loan. These elements make up a domain model.

An interactive document configurator (IDC) assists a user in selecting the appropriate document components from an archive during a document editing session. The document components are selected based on a set of configuration rules which may be interactively updated during a document assembly and editing session. This interactive document configurator (IDC) is described in the above-mentioned co-pending U.S. patent application No. 09/497,802 having IBM Docket No. YO999-167, incorporated herein by reference in its entirety.

In a document assembly method using an object model to describe the domain elements that a document's text directly or indirectly refers to, the object model may be captured and linked to the document. This document assembly method and apparatus is described in the above-mentioned U.S. patent application No. 09/497,801 having IBM Docket No. YO999-201, incorporated herein by reference in its entirety.

In addition to document components, domain components are also represented. Domain components are symbolic encodings of entities and their attributes (or properties) about which a document component is written (e.g., things the document component's text or outline might refer to). They are typically represented as objects in an object-oriented programming language like JAVA or a mark-up language like XML.

In conventional document assembly systems, importation of document components is typically based on fixed criteria which presents problems for complex documents. For example, a particular clause may be reused throughout a document, and it may be integrated within a larger assembly of document components which is referred to as a "container" or "container assembly". There must be links between the container assembly and the document component being important during document assembly, and both items may contain variables which may refer to the same domain concepts.

Maintaining consistency between theses variables once the document component (source component) has been imported presents problems unless these variables representing the same concepts are somehow linked to one another. Hitherto the present invention, such a solution has not been provided and hence these problems have been prevalent.

For example, assume a company has many stores and many addresses associated therewith including an address (having an address type/format) of a registered office thereof. Such an address (or address type) might be a component which could be in the document or not (e.g., it is optional).

Such a component would want to be filled in with an address section. However, in the library of components, one would not want to include an address section for every possible person, every possible registered office, and every address type for the entities, since to do so would overload the database (e.g., with every possible address). Instead, all that is desired is to fill in the component with a generic address section with possibly several variations. Again, to do otherwise would make the database enormous. Thus, for example, an address (or address type) might already exist in the document for representing the address of a retail superstore company. Such an address (or address type) might be the one to be used for the registered office.

Thus, once the component (including variables therein) is imported, it would be desirable to link such variables to addresses already in the containing document (e.g., such as the address for the registered office or the address of the retail superstore), rather than have to store a different component for every address a user might have in all of their documents.

Hitherto the invention such a problem has not been addressed, let alone a solution found thereto. Indeed, with the conventional systems and methods, there are simply container variables and components.

That is, the conventional system merely gives the address in the document and the variables. For example, the document may simply have a variable for an address. The component of the address might be to provide a tabbed-in address. Such even could be made a variable, so that it could be clicked on in the document and the address would change (e.g., from Joe's address to Suzy's address). However, the conventional system would not allow a different address component (e.g., which structures the address differently such as in-line, tabbed-in, address with county, etc.) to be interactively manipulated. Thus, in the case above, Joe's address might be desired, but the address component (e.g., format of address presentation) could not be changed to change the structure of the address (not necessarily the content).

In the conventional system, the component (independent of its content) that structures the variables together is not independent of the value assignment. As a result, no manual linking of these concepts is provided, and thus there is minimal (if any) flexibility and/or reusability of the components since the components are not generally applicable or generic.

Further, there may be several different components in the document that all refer to the same concepts (e.g., the company's address is repeated in different places throughout the document). Since in conventional systems the variables in the different components are not linked, if the company's address is changed in one location, it will not be updated elsewhere. This a serious maintenance problem that would be fatal to a system that relies heavily on component-based drafting.

SUMMARY OF THE INVENTION

In view of the foregoing and other problems, disadvantages, and drawbacks of conventional systems, it is, therefore, an object of the present invention to provide a structure and method for document component importation and variable reconciliation.

It is an object of the present invention to provide a mechanism for reconciling and linking variables contained in document components being imported (e.g., source components) to variables in the assembly of components at a destination.

A further object of the present invention is to provide a connector that maps the variables in a source template onto the variable in a container assembly.

Another object of the present invention is to provide a tool for creating a new variable in the container assembly as the result of a reconciliation process in which no matching variable is found to maintain consistency in the document after the importation.

In a first aspect of the present invention, a method of reconciling component variables with container variables in a document, includes identifying variables in a component, for each of these variables determining if there is a variable in the container that refers to a same domain concept, and, if an identification occurs, associating the variable in the component with the variable in the container.

In another exemplary aspect of the invention, a method of reconciling component variables with container variables in a document, includes identifying a component variable, determining if there is a container variable in a container that refers to a same domain concept as the identified component variable. If a container variable is determined to refer to the same domain concept as the identified component variable, the method includes associating the component variable with the container variable. If no container variable is determined to refer to the same domain concept as the identified component variable, the method includes associating the identified component variable with an element in a domain model of the document having a best identity match. The method further includes displaying the association between the identified component variable and the container variable or the domain model element to a user, wherein the user either accepts or overrides the association. In yet another exemplary aspect of the invention, if the variable in the component has a value, then no mapping is performed by the reconciler. In yet another exemplary aspect of the invention, the variables in the container are reconciled with those in the components.

Link expressions may be used as part of the preferred embodiment as a reconciliation algorithm.

In a second aspect, a system for implementing the above method is provided. Further, a signal-bearing medium is provided for storing the program implementing the above-described method.

"Variable reconciliation" refers to the above-mentioned process of identifying variables (e.g., and their associations) that represent the same concepts and linking them together. Such identification can be performed automatically by the system, or by the user interactively. In manual and automatic reconciliation, a system component termed a "connector" (or "reconciler") implements variable reconciliation. That is, the connector always implements variable reconciliation, regardless of whether it is automatic or interactive. In automatic reconciliation, the system creates the connector itself, whereas in interactive reconciliation, the user has a part in determining what the connector will be.

With the unique and unobvious aspects and features of the system and method of the invention, a superior solution is provided to the problems of eliciting, capturing and expressing a user's tacit requirements during document assembly by making available intelligent alternative choices of data stored in a knowledge management repository.

It is noted that, in the automatic mode, when a component is brought in, the component may be built off of the same model. Thus, the user need not manually tell the reconciler that this address belongs here and this address belongs there. However, if a component (e.g., such as an address component) is more generally reusable, then the user can tell the reconciler that there are many addresses in the document and the user tells the reconciler which address(es) the values of the variables are to be assigned to.

Thus, if there are two possibilities for a component variable, and one is selected by the user, then the reconciler of the present invention will reconcile the choice made throughout the document.

The manual reconciler (e.g., the reconciler in manual mode) allows a mapping of the values of the component to the values in the containing document, thereby allowing a manual linking if there is more than one choice.

Normally, the system is in the above-mentioned automatic mode. That is, the automatic reconciler allows automatic reconciliation (linking, matching, identification of associations, etc.) since the components are built from the same model. However, in some scenarios, a manual linking may be desirable.

Thus, an advantage of the reconciler according to the present invention is that independent components can be created. Hence, generic components (e.g., such as address components) can be used to avoid having to create one, for example, for each person in a database.

With the invention, there are three concepts which are considered including 1) the place in the document where the address goes; 2) the address component (e.g., in-line, etc.) that plugs in and out of the position in the document; and 3) the particular domain model information which plugs into the address. The inventive reconciler allows a manual linking of these concepts, thereby allowing greater flexibility and greater reusability of the components because the components are more generally applicable.

Thus, with the unique and unobvious features of the present invention, the user can reduce its database requirements, increase flexibility and reusability in that for any given document component the document component can be applied more generically to increase its reusability (e.g., more generically reusable), can determine the linkages, and leverage loose coupling of the domain knowledge and document knowledge. Further, the invention allows reconciliation to performed interactively by the user.

BRIEF DESCRIPTION OF THE DRAWINGS

The foregoing and other objects, aspects and advantages will be better understood from the following detailed description of a preferred embodiment of the invention with reference to the drawings, in which:

FIG. 6 illustrates a block diagram of the environment and configuration of a system 600 according to the present invention; and FIG. 7 illustrates a storage medium 700 for storing steps of the program for presenting and navigating a variable object model.

DETAILED DESCRIPTION OF PREFERRED EMBODIMENTS OF THE INVENTION

Figure 1:
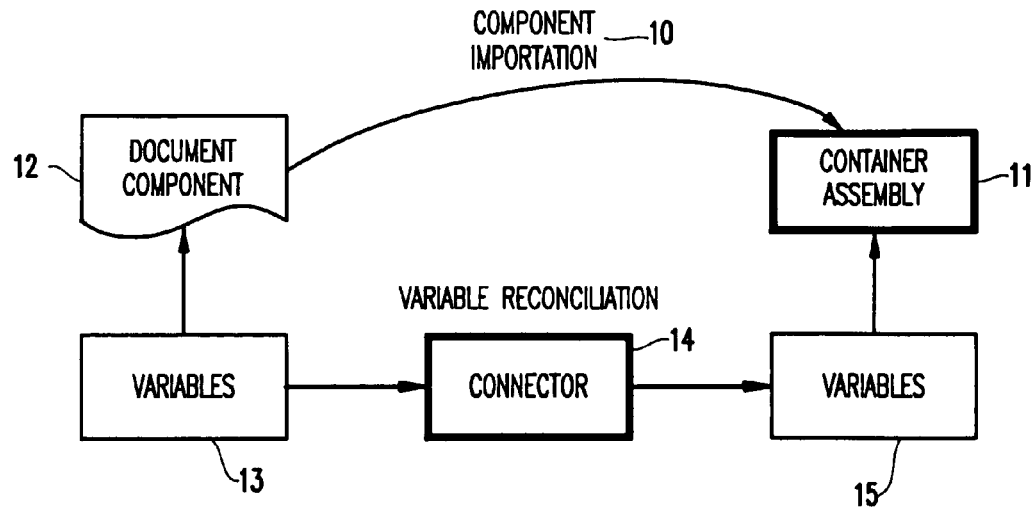
FIG. 1 shows an overview of a component importation process 10.

Referring now to the drawings, and more particularly to FIGS. 1–7, there is shown a preferred embodiment of the method and structures according to the present invention. For consistency and ease of understanding, the same reference numerals in the drawings will be used to designate like elements in the drawings.

Referring now to FIG. 1, a preferred embodiment of the present invention will be described below.

FIG. 1 shows a component importation process. Component importation system 10 includes a container assembly 11 (e.g., a destination or end product) and the document component 12 (e.g., the source component) being imported into the container assembly 11.

The container assembly 11 and the document component 12 typically contain variables. Some or all of the document component variables 13 may refer to the same domain concepts as referred to by the container assembly variables 15. To maintain consistency in the document after the importation, these like variables are linked to each other.

The process of identifying (e.g., associating) variables that represent the same concepts and linking them together is referred to as "variable reconciliation". A connector 14 performs the variable reconciliation, holds variable mapping, and maintains consistency in the document after importation. The connector is produced as a first step in the reconciliation process. It may be produced automatically or with assistance from the user, as mentioned above. Once the connector has been created, it is used in order to complete the reconciliation and link the component variables to the container variables. The invention preferably uses the concept of a mapping table as a tool. The conventional document assembly systems do not use mapping tables for this purpose. Moreover, an important aspect of the present invention is in how the mapping table gets populated. In the exemplary GUI, the connector disappears once importation is over but this needs not be the case.

In the exemplary embodiment, the connector is preferably a collection of mappings from component variables to container variables. It is not necessarily complex in structure, nor does it perform any functionality of its own. The exemplary embodiment of the connector may be a collection of hash tables.

Figure 2:
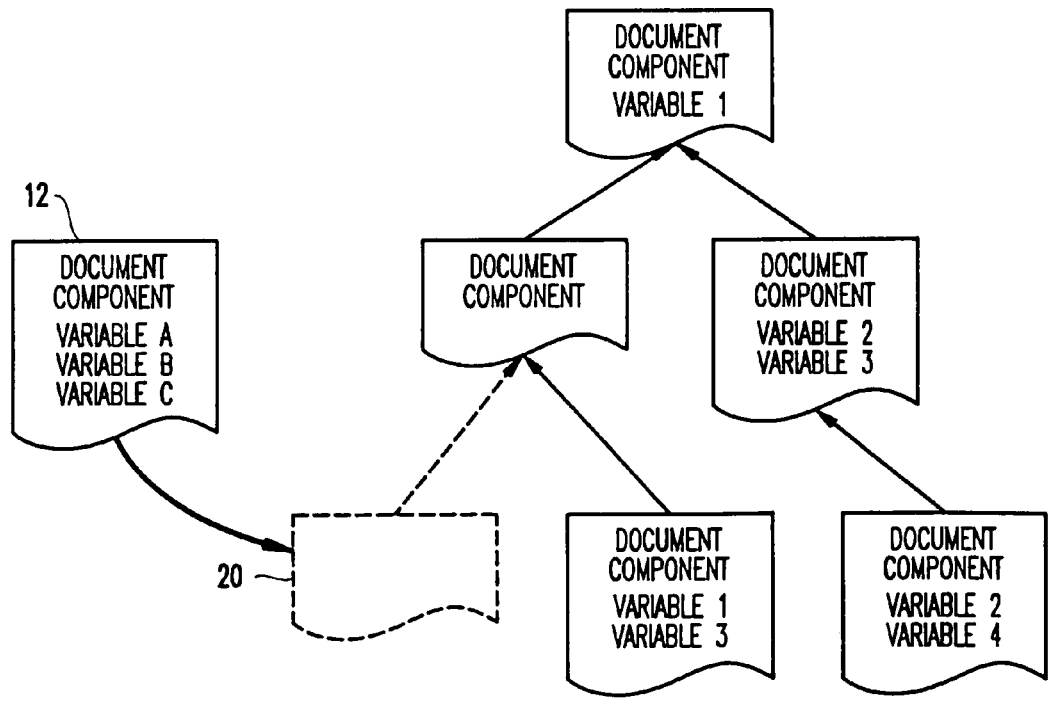
FIG. 2 shows source and assembly components with variables before importation.

Referring to FIG. 2, the document component 12 (e.g., source component) is imported into the container assembly 11 composed of previously imported document components. The dotted outline 20 indicates the target location in the container assembly 11 where the document component 12 will be attached after importation.

Shown with each document component is a list of variables referenced within that component. For example, the source component 12 has three variables (e.g., A, B, C in the exemplary embodiment; obviously the source component may have more or less variables as determined by the designer/user). The container assembly 11 has a total of 4 variables (e.g., variables 1–4) referenced in the plurality of document components held in the container assembly 11.

Figure 3:
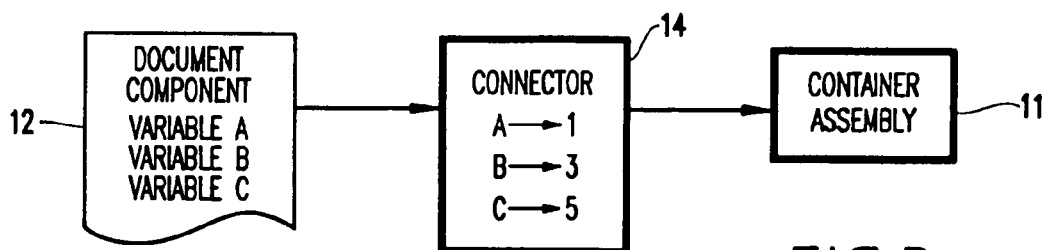
FIG. 3 shows a connector 14 for linking source and container assembly variables.

Referring to FIG. 3, a connector 14 is created (e.g., the first step of each reconciliation process) that maps variables in the document component 12 (e.g., source component) template to the variables in the container assembly 11 during the importation process. Connectors are not currently reused but may be.

The mapping is determined by a reconciliation algorithm described in further detail below. The reconciliation algorithm has mapped document variable A to container variable 1. That is, the reconciliation algorithm has mapped document variable A from the document component 12 to container variable 1 in the container assembly 11. The connector 14 holds the mapping of these two variables representing the same domain concept. Thus, the connector is merely an object that stores mappings. Mappings are added to the connector when it is constructed by the reconciliation process, and the connector may be queried for these mappings. Thus, the connector is said to "hold" mappings between variables.

Additionally, the reconciliation algorithm has mapped component variable B of the document component 12 to container variable 3 in the container assembly 11 or containing document. Variable C of document component 12 has no equivalent variable in the container assembly 11 representing a similar domain concept. In this case, a new variable 5 must be created in the container assembly 11 to represent this domain concept. This addition to the variables in the container assembly is shown in the connector 14 created for this document component importation.

Then, the connector 14 holding the mapping of variables is used during the importation process to reconcile the variables (e.g., associate/identify links) in the source component 12 with the variables in the container assembly 11.

Figure 4:
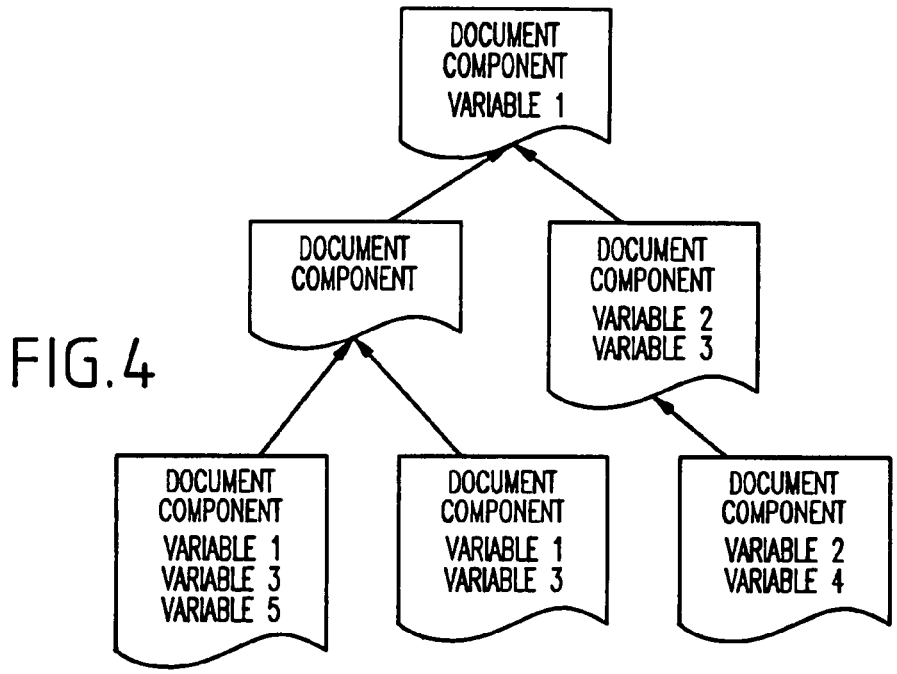
FIG. 4 shows a container assembly after importation using the connector 14 of FIG. 3.

FIG. 4 shows the component assembly after component importation, using the connector 14, has been completed.

In FIG. 4, the variables from document component 12 (e.g., variables A–C) have been mapped to container assembly variables (e.g., 1, 3, 5). As mentioned above, a new container variable (e.g., variable 5) was created to represent variable C of the document component 12. The occurrences of variables A, B, and C within the text of the source component are now occurrences of variables 1, 3 and 5 of the container assembly 11. Thus, a linking (e.g., associating) has been performed by the connector, to increase the reusability and flexibility of the variables.

The values of the occurrences of these linked variables and the properties of the occurrences (e.g., such as their default formatting such as address formatting type, etc.) are synchronized to change together. The occurrences of variables A and B are now indistinguishable from previously-existing container assembly occurrences of variables 1 and 3.

The actual algorithm used to determine mappings can vary from the exceedingly simple to the very complex. In an exemplary implementation, an algorithm is used based on names, as described below. Other algorithms may use the model context (e.g., relationships to other objects in the mode) and/or linguistic heuristics to infer and propose useful mappings. One of the simplest algorithms may be to map variables based on their names. Under this algorithm, for example, a variable called "lender" (e.g., given a financial environment, etc.) in the source template would be automatically mapped to a variable called "lender" in the container assembly.

While an algorithm mapping variables based on their names may succeed in many cases, it would require consistent naming of variables throughout all document components, which may be very difficult to ensure when there are many different authors of components.

For example, it is conceivable that a variable may be named "lender" in one component, but named "bank" in a second, less specific component (e.g., perhaps one that could apply to any bank, regardless of its role as lender or borrower). The name reconciliation algorithm would fail in this case.

In another aspect, a more complex algorithm could be used and would require the classification of all variables within a hierarchy. Under this approach, the system could recognize that a bank is a possible type of lender, and could map the variables appropriately. The number of possible algorithms which can be applied to map document components is infinite. The choice would be left to a designer depending upon the designer's constraints, requirements, and desires based on an end product.

In the embodiment discussed above, the reconciliation process is entirely automated. The system decides which variables refer to the same domain concepts, and maps them automatically.

In a further aspect of the present invention, users may interactively alter the mappings provided by an automated algorithm to achieve a more precise linkage between source document component variables and container assembly variables. Ultimately, in preparing a complex document the human user will know which variables refer to the same domain concepts and which do not. An interactive reconciliation mode is appropriate for this type of user.

Figure 5:
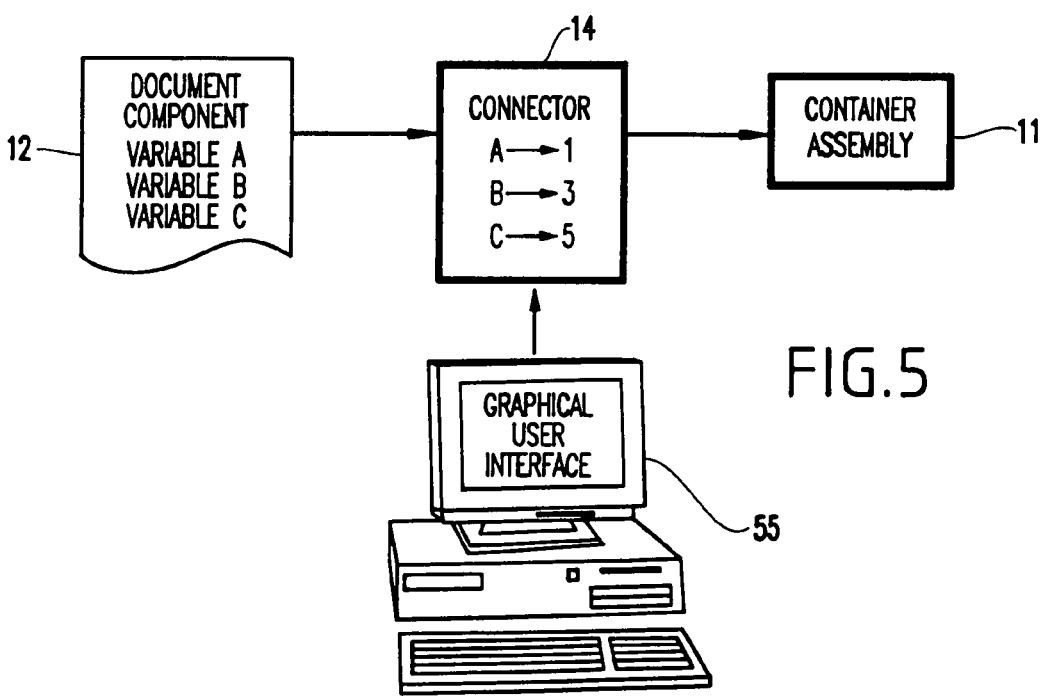
FIG. 5 shows a graphical user interface (GUI) 55 for use with the method and system of the present invention.

Along these lines, as shown in FIG. 5, when a component importation operation is initiated in an interactive reconciliation mode the system will produce mappings in connector 14 and output these to the user via a graphical user interface (GUI) 55. The user may then edit the mappings overriding the system generated mapping. Once editing of the system generated mapping is completed, component importation is continued using the edit mappings.

In one exemplary implementation, the identifying is performed interactively by the user. The system displays component variables and their link expressions next to a representation of elements of the domain model. The user then makes the linking (e.g., associations) by clicking on (actuating via input device) the appropriate variable(s) in the components and matching the variable(s) to an element of the containing document's domain model. Each variable in the component may be matched, but need not be depending upon the user's desires.

Along these lines, the user can select either the imported component value or the containing document's variable as the value which is to be used. Thus, the variable(s) is/are allowed to attach to components. Hence, the user by using a graphic user interface (GUI), identifies the associations between the component variable and a domain model element.

As shown in FIG. 6, a typical hardware configuration of an information handling/computer system 600 in accordance with the invention preferably has at least one processor or central processing unit (CPU) 611. The CPUs 611 are interconnected via a system bus 612 to a random access memory (RAM) 614, read-only memory (ROM) 616, input/output (I/O) adapter 618 (for connecting peripheral devices such as disk units 621 and tape drives 640 to the bus 612), user interface adapter 622 (for connecting a keyboard 624, mouse 626, speaker 628, microphone 632, and/or other user interface device to the bus 612), communication adapter 641 (for connecting an information handling system to a data processing network), and display adapter 636 (for connecting the bus 612 to a display device 638).

As shown in FIG. 7, in addition to the hardware and process environment described above, a different aspect of the invention includes a computer-implemented method for performing a document component importation and reconciliation, as described above. As an example, this method may be implemented in the particular hardware environment discussed above.

Such a method may be implemented, for example, by operating the CPU 611 (FIG. 6), to execute a sequence of machine-readable instructions. These instructions may reside in various types of signal-bearing media.

Thus, this aspect of the present invention is directed to a programmed product, comprising signal-bearing media tangibly embodying a program of machine-readable instructions executable by a digital data processor incorporating the CPU 611 and hardware above, to perform a document component importation and reconciliation.

This signal-bearing media may include, for example, a RAM (not shown) contained within the CPU 611, as represented by the fast-access storage for example. Alternatively, the instructions may be contained in another signal-bearing media, such as a magnetic data storage diskette 700 (FIG. 7), directly or indirectly accessible by the CPU 611.

Whether contained in the diskette 700, the computer/CPU 611, or elsewhere, the instructions may be stored on a variety of machine-readable data storage media, such as DASD storage (e.g., a conventional "hard drive" or a RAID array), magnetic tape, electronic read-only memory (e.g., ROM, EPROM, or EEPROM), an optical storage device (e.g., CD-ROM, WORM, DVD, digital optical tape, etc.), paper "punch" cards, or other suitable signal-bearing media including transmission media such as digital and analog and communication links and wireless. In an illustrative embodiment of the invention, the machine-readable instructions may comprise software object code, compiled from a language such as "C", etc.

The document component importation system and interactive reconciliation method discussed above, provide a superior solution to the problems of eliciting, capturing and expressing a user's tacit requirements during document assembly by making available intelligent alternative choices of data stored in a knowledge management repository.

Thus, returning to the example above with regard to storing addresses/address formats, with the invention, when a value is set, one goes to the source library holding, for example, a plurality of addresses and address formats, and obtains an address and brings it in. Thus, the component (e.g., address), which may have address variables contained therein, is taken in. The user may not know what values to assign to those address variables since there are many addresses in the document (e.g., address of corporation, address of registered agent, address of superstore, etc.).

Thus, the reconciler according to the present invention is turned on. Hence, when there is at least one variable in the source template, then the reconciler is turned on.

Now, when the value is set as an address, the reconciler window comes up which indicates that the component which is being brought in (e.g., address component), has a variable associated with it (e.g., Corporation1). In this case, for example, the reconciler essentially queries "which corporation do you want the variable to be associated with in the containing document". Thus, an assignment is made based on what the reconciler is told to do.

Normally, when a component is brought in, the component may be built off of the same model. Thus, the user need not manually tell the reconciler that this address belongs here and this address belongs there. However, if a component (e.g., such as an address component) is more generally reusable, then the user can tell the reconciler that there are many addresses in the document and the user tells the reconciler which address(es) the values of the variables are to be assigned to.

Thus, if there are two possibilities for a component variable, and one is selected by the user, then the reconciler of the present invention will reconcile the choice made throughout the document.

The manual reconciler (e.g., the reconciler is manual mode) allows a mapping of the values of the component to the values in the containing document, thereby allowing a manual linking if there is more than one choice.

Normally, the system is in automatic mode. That is, the automatic reconciler allow automatic reconciliation (linking, matching, identification of associations, etc.) since the components are built from the same model. However, in some scenarios, a manual linking may be desirable.

For example, a manual linking may be desirable given a plurality of different addresses types (e.g., address with a county designated, address with a signature block designated, address with the state spelled out, address for a mailing label, etc.). However, there might not be any particular person's address (e.g., John Doe's address) present.

Thus, if a particular type of address (e.g., address with signature block) is desired for a person, when the reconciler is opened and the value of a variable is set for an address with a signature block, the reconciler will ask "what person in the document do you want the address type associated therewith?" Then, the person is designated with the address type. Thus, if that person has an address variable associated therewith, then the reconciler assigns that person with a particular type of address at that position of the document.

The unique and unobvious advantage of the reconciler according to the present invention is that independent components can be created. That is, when we go to set a value for a component (e.g., address component), the user does not get an address for a plurality of persons (e.g., Joe Smith, Jenny Jones, Suzy Leibowitz, etc.). Instead, the user is presented with different address types (e.g., in-line address with the county designated, address with the name, address with the zip code, etc.) so that when the user uses that component, the system asks "what address in your document do you want the address to apply to?" With the reconciler, the user can tell the system what address type can apply to this particular person (e.g., President of ACME Corporation, etc.) and the reconciler will extract the address information for that person and will insert that address in the address type format at the component in the document.

This is important for avoiding having to create different type addresses for every different type of people (e.g., secretary of corporation). Indeed, one may have many different people with many different addresses. The reconciler allows having people and having addresses. The reconciler allows bringing in different components (e.g., in the address example, it may have variables of street address, county, state written out, zip code, etc.). The reconciler allows the user to link up address information with a component when it appears in a document.

As another example, instead of using an in-line address for the President of the Corporation, assume that the treasurer is selected and an in-line address is desired. Then, the reconciler would import an address component (e.g., in-line) and essentially would ask what address do you want this component to apply to at this position in the document. The user would link the treasurer's address with the address component at that position. Hence, a clear benefit is that a different address type need not be created for each person in the database. Instead, generic components (e.g., such as address components) can be used to avoid a having to create one for each person in the database.

Thus, for each person in the database (e.g., assume 4,000 persons' addresses), in the conventional systems and methods, if there were ten different types of addresses (e.g., in-line address, signature block address, county, etc.), then a total of 40,000 addresses would need to be stored. With the invention, only 4,000 addresses would have to be entered initially, and 10 address components created, with the reconciler linking the desired address component to an address of the user's choice. Moreover, if new formats were added, no change to the original 4,000 addresses would have to be made Thus, with the unique and unobvious features of the present invention, the user can reduce its database requirements, increase flexibility and reusability in that for any given document component the document component can be applied more generically to increase its reusability (e.g., more generically reusable), can determine the linkages, and leverage loose coupling of the domain knowledge and document knowledge. Further, the invention allows reconciliation to performed interactively by the user.

While the invention has been determined in terms of preferred embodiments, those skilled in the art will recognize that the invention can be practiced with modification within the spirit and scope of the appended claims.

What is claimed is:

1. A computer-implemented method of automatically reconciling component variables with container variables in a document, comprising:

identifying a component variable;

determining a container variable that refers to a same domain concept as the identified component variable;

associating said component variable with the container variable; and accepting and/or overriding said association between said identified component variable and said container variable, wherein a user interactively performs said accepting and/or overriding.

2. A computer implemented method of reconciling component variables with container variables in a document, comprising:
identifying a component variable;
determining if there is a container variable in a container that refers to a same domain concept as the identified component variable;
if a container variable is determined to refer to the same domain concept as the identified component variable, associating said component variable with said container variable;
if no container variable is determined to refer to the same domain concept as the identified component variable, associating said identified component variable with an element in a domain model of the document having a best identity match; and
displaying the association between said identified component variable and said container variable or said domain model element to a user,
wherein said user either accepts or overrides said association.

3. The method according to claim 2, wherein said best identity match comprises a direct match.

4. The method according to claim 2, wherein, when said best identity match is determined, a new container variable is created and the identified component variable is linked with the newly-created container variable.

5. The method according to claim 4, wherein the identified component variable assumes a value of the linked container variable in a containing document and the identified component variable is positioned in the document with the value.

6. The method according to claim 2, wherein said best identity match matches the identified component variable to domain model elements of the document to find the best match.

7. The method according to claim 2, wherein said identified component variable is interactively displayed.

8. The method according to claim 2, wherein a plurality of identified component variables in a component are interactively displayed.

9. The method according to claim 2, wherein said overriding said association comprises actuating the identified component variable and interactively matching the identified component variable to an element in the domain model of the document.

10. The method according to claim 9, wherein said overriding said association is performed by said user for multiple identified component variables within a component.

11. The method according to claim 10, wherein said user interactively determines whether values to be assigned to the identified component variables, once matched, should be the values in the document or the values in the imported components when said imported components have values.

12. The method according to claim 2, wherein said automatic reconciliation algorithm automatically determines that a value to be assigned to the component variable is the value in the document.

13. The method according to claim 2, wherein said user overrides said association through a graphical user interface (GUI) by associating said component variable with a domain model element.

14. The method according to claim 2, wherein the user interactively selects a container value.

15. A system for reconciling component variables with container variables in a document, comprising:
means for identifying a component variable;
means for determining if there is a container variable in a container that refers to a same domain concept as the identified component variable;
if a container variable is determined to refer to the same domain concept as the identified component variable, means for associating said component variable with said container variable;
if no container is determined to refer to the same domain concept as the identified component variable, means for associating with identified component variable with an element in a domain model of the document having a best identity match; and
means for displaying the association between said identified component variable and said container variable or said domain model element to a user;
wherein said user either accepts or overrides said association.

16. A signal-bearing medium tangibly embodying a program of recordable machine readable instructions executable by a digital processing apparatus to perform a method of reconciling component variables with container variables in a document, said method comprising:
identifying a component variable;
determining if there is a container variable that refers to a same domain concept as the identified component variable;
if a container variable is determined to refer to the same domain concept as the identified component variable, associating the component variable with the container variable;
if no container is determined to refer to the same domain concept as the identified component variable, associating said identified component variable with an element in a domain model of the document having a best identity match; and
displaying the association between said identified component variable and said container variable or said domain model element to a user,
wherein said user either accepts or overrides said association.

* * * * *